April 30, 1968     H. W. ALEXANDER     3,380,377
AUTOMATIC DISPENSING FOOD GRILL
Filed Oct. 21, 1965
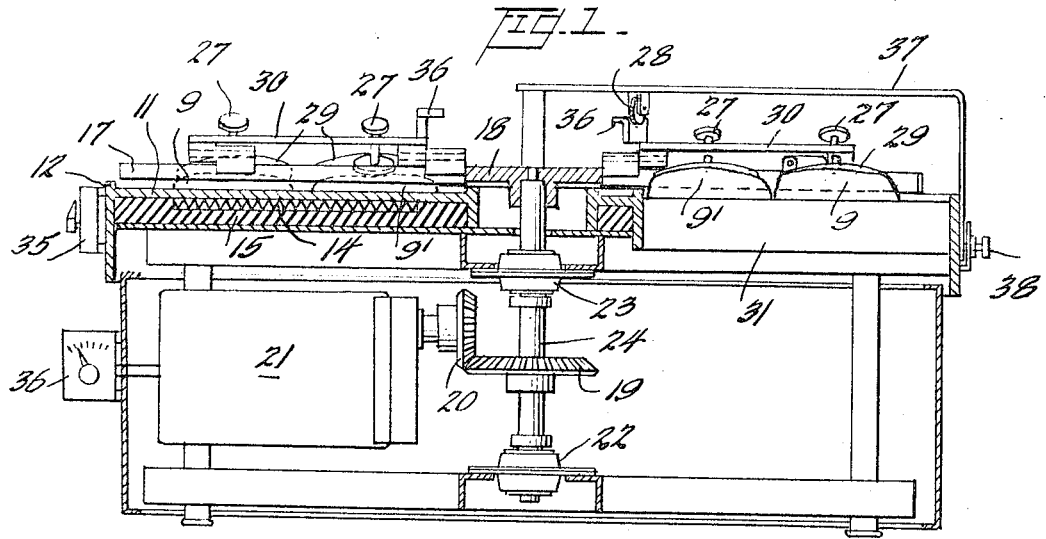
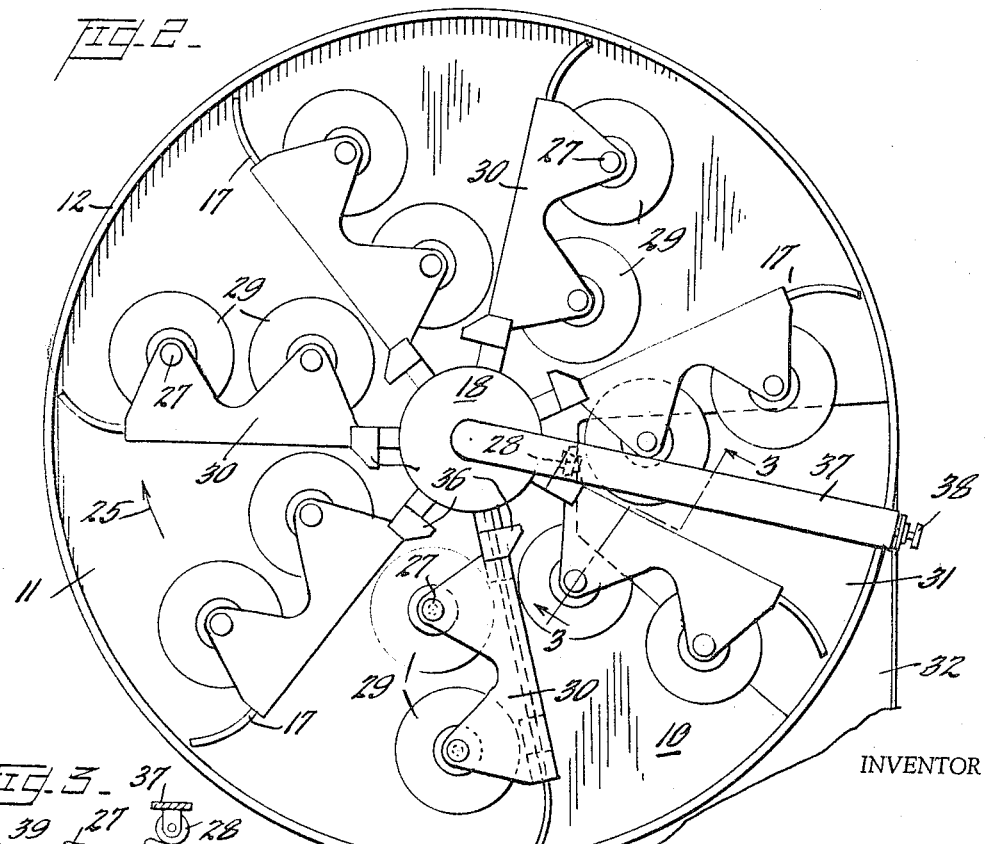
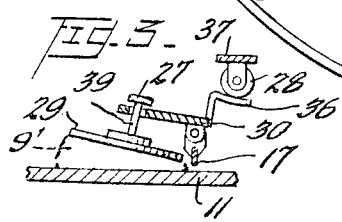
INVENTOR
Harry W. Alexander,
BY Watson, Cole, Grindle & Watson
ATTORNEYS

United States Patent Office 3,380,377
Patented Apr. 30, 1968

3,380,377
AUTOMATIC DISPENSING FOOD GRILL
Harry William Alexander, Box 256, Rte. 1,
Leesburg, Va. 22075
Filed Oct. 21, 1965, Ser. No. 500,063
3 Claims. (Cl. 99—423)

ABSTRACT OF THE DISCLOSURE

A grill is provided to toast one side of a sliced bun by clamping it with a pivoted flap on a heated surface for rotary motion about only a part of a 360° path. Discharge means is provided over the remainder of the path to permit the buns to drop by force of gravity. Variable toasting density is accomplished by the pressure of contact or by timing the travel path such as by varying motor speed.

---

This invention relates to a grill for warming food articles such as rolls or buns and, more particularly, it relates to a food warmer with provisions for accurately gauging the extent to which the articles are heated.

Many restaurants wish to serve rolls and buns warm, but, in general, it is difficult to efficiently heat such rolls and buns to uniform extent. This is partially true because the rolls are generally deformable and should not be significantly altered in appearance and because the texture provides semi-insulation which is difficult to heat through quickly and uniformly. Thus, it is found that it is unsatisfactory to heat such buns in a toaster or an oven since even if temperature and time are held constant, they may not be heated through uniformly and it is extremely difficult, particularly under conditions encountered in restaurants during rush hours, to allocate time for monitoring the timing or period which the rolls are heated and to choose after observation the appropriate temperatures and times encountered in different ovens, toasters, and the like.

Accordingly, it is an object of this invention to provide improved bun warmers for consistently and uniformly heating rolls and buns.

It is a further object of this invention to provide bun warmers which can be used in restaurants during rush hours without significant monitoring or attention.

Thus, in accordance with the present invention, it has been found that because of the semi-insulating properties of buns and rolls, ordinary heating elements in ovens which convey buns through a heated air path do not provide consistent heating and, in general, the surface of the buns may be heated without warming up the interior. This problem is resolved by providing a grill plate, and keeping the buns in forced surface contact with the grill plate so that the heat is transmitted directly to the bun fibers by thermal surface contact between the grill plate and the bun. In this manner, the amount of heat may be gauged accurately to provide uniformly heated and grilled rolls or buns. Thus, an automatic dispensing bun grill is constructed in accordance with the invention to provide for conveyance across the surface of a grill plate for a fixed time period while maintaining a surface thermal contact between the bun and the heating plate, and automatically discharging the article after the fixed time period into a dispensing tray.

Buns may be either be manually or automatically loaded into such a bun grill and may be delivered automatically after processing without monitoring during the grilling operation by help in a restaurant kitchen. Furthermore, in accordance with the invention there is provided means for variably adjusting the pressure on the buns so that the surface thermal contact may be realized for appropriate heating without significantly deforming the shape of the rolls or buns which are thus conveyed across the heated grill plate.

These features along with further objects and advantages of the invention will be described in detail in the following specification with reference to the accompanying drawings, wherein:

FIGURE 1 is a side view partially in section of a rotary dispensing food grill assembly;

FIGURE 2 is a top view of the bun grill assembly shown in FIGURE 1;

FIGURE 3 is a section view of the grill taken along lines 3—3 of FIGURE 2;

With reference now to the embodiment of the invention shown in FIGURES 1, 2, and 3, the food grill provides both buns 9 to be manually placed in the entrance section 10 to thereby be conveyed in a circular path upon the grill plate 11 which has a confining ridge 12 around the edge thereof for retaining the buns within the circular grill plate. The grill plate is heated by the heater element 14 which is surrounded by insulation material 15 to provide a substantially uniform temperature throughout the surface of the circular grill plate 11.

The buns are moved around the circular path on the heater plate 11 by means of conveying arms 17 extending from the hub 18 radially into various sectors about the circular plate 11. These arms 17 are driven through gear train 19, 20 by the electric motor 21 by means of drive shaft 24 which is journalled in bearings 22 and 23. Thus, each sector arm 17 will engage the sides of the buns 9 and push them around the circular grill plate in the direction of arrow 25 while in contact with plate 11.

In accordance with the present invention, the uniform heating of the buns 9 is established by making a definite repeatable degree of thermal surface contact between the bun and the heater plate 11. Thus, upon each sector arm 17 is provided a cammed flap or paddle 30 which includes weighted caps 29 to bear down upon the buns 9 with constant pressure by force of gravity to hold the buns in forced surface contact providing a thermal contact between the bun and the grill plate 11. The buns 9 may be manually loaded into the entrance sector 10 as the flap 30 on the arm 17 is lifted up by cam roller 28 by inserting the buns underneath the caps 29 after which the buns are automatically conveyed around the circular grill plate by the sector arms 17 until they reach the aperture portion 31 extending through the plate 11 and leading into conveyor chute 32, at which their heating period is abruptly terminated and they may be picked up at the convenience of the waiter.

The flaps 30 are lifted for inserting buns 9 by the simple automatically cammed lift assembly roller 28 and associated cam 36 in a position selected by positioning of radial arm 37, which may be locked in place by screw 38.

As seen from FIGURE 3, the cap 29 is held by retainer 27 and shaft 39 within an aperture in flap 30 to be lifted up as cam roller 28 engages cam surface 36. The cap 29 may be weighted to provide the proper surface pressure between bun 9 and plate 11 when the cap is dropped upon the bun as the roller 28 passes over the end of cam 36. In this operation it is significant that the aperture surrounding shaft 39 is large enough in the thin plate of flap 30 to hold the shaft 39 loosely thus to permit the cap to tilt and conform with the top surface of the bun 9 which might be cut on a bias as shown. This assures uniform heating of all buns processed by a simple weighted cap assembly mounted in the pivoted flap 30 for three dimensional conformation to the bun surface. Since the bun is pushed along by sector arm 17 as weighted down by caps 29, there is no tendency of the bun to move out from under the gravity force of the weighted cap.

Note that the caps 29 are generally in diameter as large as the buns thereby serving when in place to cover the bun and retain heat and moisture therein, which would be lost with a cap of smaller diameter.

While it is to be recognized that the inner bun 9' may travel a path shorter than that of the outer bun 9 when being conveyed around the circular grill plate to fall through the aperture 31, because (1) the thermal bond on the surface is somewhat constantly regulated throughout the travel by means of the pressure caps 29 on flaps 30 and (2) the time of conveyance around the circular plate is constant because of the driving of shaft 24 and the sector arms 17 by motor 21, both the inner and outer buns will be grilled or heated to the same extent.

The pivoted mounting of the flap 30 upon the conveyor spoke arm 17 provides a lever arm weighted down by the caps 29 to produce a camming bias without springs, which would, if used, tend to collect food particles, and are difficult to wash. Thus, the entire assembly is sanitary and provides easy removal for washing by merely lifting hub 18 off the keyed end of shaft 24 after screw 38 is released.

The pressure may be properly gauged for rolls of different sizes or textures by replacing caps 29 or by affixing weighting rings thereto. In general, the pressure supplied upon the roll to produce good thermal contact on the roll surface as it is being conveyed is not significantly great enough to permanently deform the buns and they may be delivered at delivery chute 32 without being disfigured in the conveyance mechanism. The extent of grilling can be established to some degree by adjusting the amount of gravity pressure upon the buns 9 in accordance with the present invention and this, together with adjustments upon the temperature of the grill plate by means of temperature control 35 or adjustments of the period upon which the buns are carried in contact with the grill plate as established by motor speed control 36, can give a large degree of selection of the extent of grilling available and thereby provide for adaptability to a large range of roll sizes, shapes, and textures.

It may be seen from the foregoing embodiments and illustrations of the invention that the principles afforded by the present invention may be incorporated in various configurations and that those novel features provided in accordance with this invention are defined with particularity in the appended claims. Thus, in accordance with the features of the present invention there is provided a bun heating food grill assembly which can uniformly heat the food article in a manner that is repeatable without significant monitoring or attention. Therefore, the automatic dispensing food grill assembly provided in accordance with this invention is particularly adapted for installation in restaurants where close monitoring of a bun warmer assembly is not feasible or practicable, or where the cost of providing labor for a semi-automatic bun warming function will not justify its value as a service to the food customers.

What is claimed is:

1. A bun grill for heating articles such as buns comprising in combination, a heating plate presenting a flat stationary circular surface of substantially constant heat with one sector defining an aperture therethrough a plurality of individual, radially extending contact means comprising clamp means and pushing means, said clamp means holding the articles in forced contact with said surface while said pushing means pushes said articles about said surface until they reach said aperture and means establishing a predetermined period of time for said forced contact.

2. A heater grill for toasting on only one face deformable partially insulating articles having only one flat face, such as sliced buns, comprising in combination; a substantially uniformly and continuously heated stationary surface disposed about a 360° substantially circular configuration; a set of unheated pivotable clamp units arranged in sequence at radially disposed positions about the heated surface configuration and having structure to engage the surface of a plurality of separate articles opposite the flat face with only the flat face of the articles in contact with the heated surface to apply enough pressure to assure a good thermal surface contact but with less pressure than required to significantly deform the article; continuously driven means moving the clamp units about a 360° circular path defined by and contiguous with said heated surface configuration and pivoting the clamp units individually at one station disposed about the 360° path to open for placement of the articles and to close for engaging to hold the articles against said surface, said continuously driven means being constructed to move the clamp units and the articles while clamped to the surface through a shortened cyclic path of less than 360°; and termination means constituting an aperture in said heated surface located in the remainder of said 360° path to release the articles from the pressure of each of the successive clamps moved to the position by pushing the articles from the heated surface into said aperture to let the articles fall from said heated surface at one end of said shortened 360° path by force of gravity.

3. A heater grill unit as defined in claim 2, wherein the heated place is a flat stationary circular plate with an aperture in one sector thereof, and the continuously driven means comprises a rotating shaft with individual radial arms extending on the surface to comprise the clamp units to hold down and push the articles in thermal contact about a circular path on the surface of said plate until they are discharged by fall of gravity through said aperture.

References Cited
UNITED STATES PATENTS

| | | | |
|---|---|---|---|
| 2,607,283 | 8/1952 | Crank | 99—238.5 X |
| 2,843,037 | 7/1958 | Waas | 99—425 X |
| 934,907 | 9/1909 | Fritsche | 221—82 |
| 1,524,532 | 1/1925 | Biebel | 99—386 |
| 1,543,737 | 6/1925 | Thornton | 99—387 |
| 1,621,234 | 3/1927 | Carpenter | 99—373 XR |
| 1,717,926 | 6/1929 | Horowitz | 99—387 |
| 2,170,170 | 8/1939 | Weil | 99—373 |
| 2,225,068 | 12/1940 | Marriott | 99—349 |
| 2,244,670 | 6/1941 | Benedict | 99—427 XR |
| 1,868,287 | 7/1932 | Haeringer | 99—399 |

FOREIGN PATENTS 491,504   9/1938   Great Britain.

WALTER A. SCHEEL, *Primary Examiner.*

J. M. NEARY, *Assistant Examiner.*